3,413,632
DEVICE FOR AUTOMATICALLY ADJUSTING
PHASE OF A DOPPLER INTEGRATOR
Charles L. Christianson, Baltimore, Md., assignor, by
mesne assignments, to the United States of America
as represented by the Secretary of the Navy
Filed Aug. 16, 1963, Ser. No. 303,723
5 Claims. (Cl. 343—7)

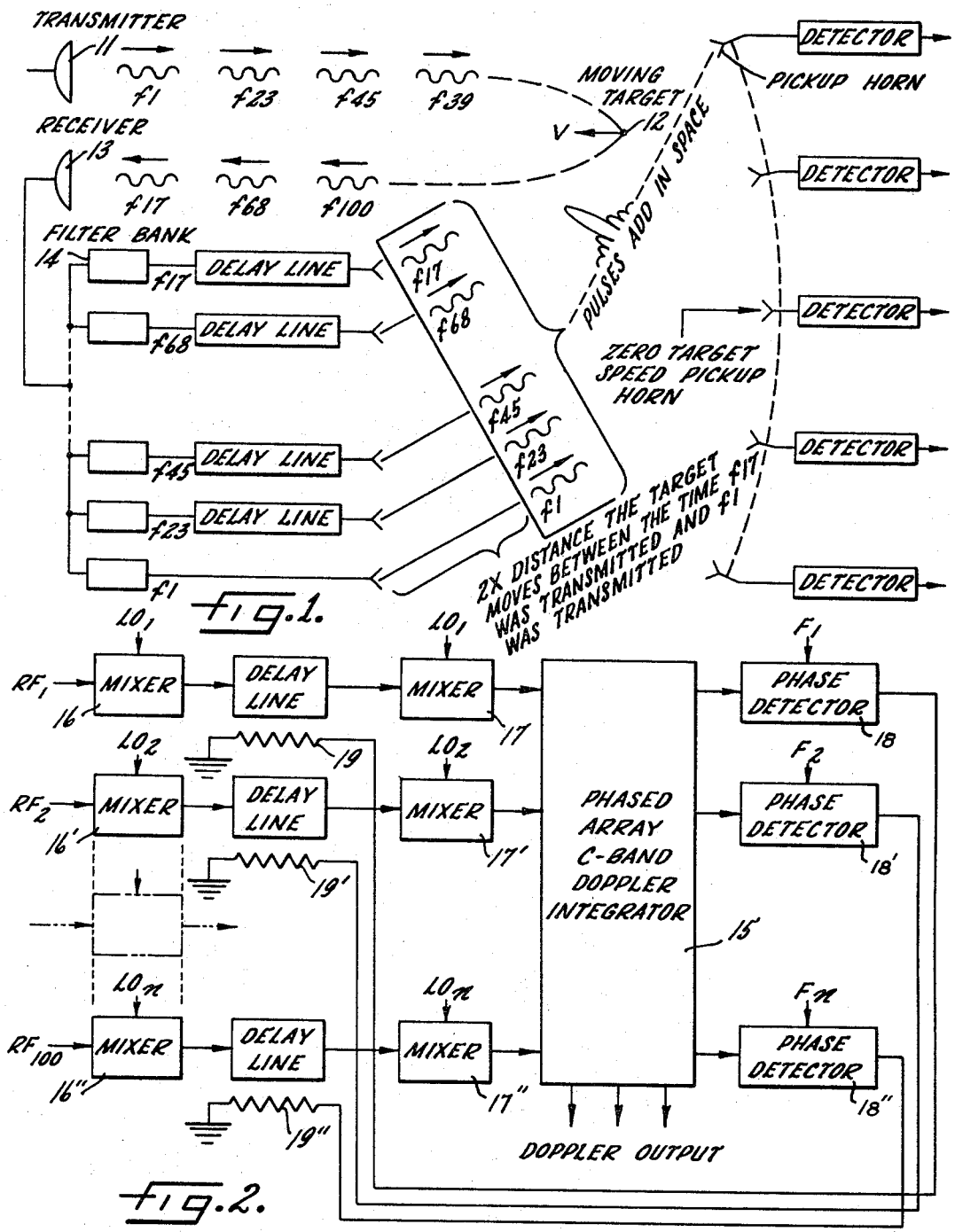

The present invention relates to a radar search receiver that supplies range and Doppler information, and more particularly to a device for automatically phase adjusting a multifrequency coherent time Doppler reading integrator in a radar search receiver.

It is well-known that a radar detects the presence of targets by transmitting electromagnetic energy that is reflected back by the targets to a receiver. It is also well-known that when a wave is reflected by a moving target that there occurs an apparent shift in frequency, which is known as the Doppler effect.

The probability of detecting a moving target is greatly enhanced by providing a plurality of pulses on each radar scan. The process of summing the returned pulses is called integration and might be either of the coherent or non-coherent type. When the summation of the returned pulses is made before detection, the integration is commonly referred to as coherent integration, and when integration is made after detection, the integration is referred to as non-coherent integration. In coherent integration it is necessary that the phase of the returned signal be preserved if full benefit is to be derived from the integration process, and thus it is important that means be provided for automatically adjusting the input phases.

The present invention provides for automatic phase compensation by sampling the transmitter output frequency and phase detecting this output frequency against the leakage RF from the transmitter during transmission. The difference, which is referred to as phase error correction, is used to control the temperature and, therefore, the phase delay of a delay line that is provided for each RF input.

It is therefore a general object of the present invention to provide a new and improved method for phase adjusting a multi-frequency coherent time Doppler reading integrator in a radar search receiver.

Another object of the present invention is to provide automatic phase compensation in a radar search receiver by controlling the temperature of a plurality of delay lines.

A further object of the present invention is to provide automatic phase compensation in a radar search receiver by providing a phase error correction signal that regulates the temperature of a plurality of delay lines.

Other objects and advantages of the present invention will be readily appreciated as the same becomes better understood by reference to the following detailed description when considered in connection with the accompanying drawing wherein:

FIGURE 1 is a diagrammatic view illustrating coherent detection of a moving target; and FIGURE 2 is a block diagram of a preferred embodiment of the present invention.

Referring now to FIGURE 1 of the drawing there is shown a transmitter 11 that, for purposes of illustration, is assumed to transmit 100 pulses each at a different frequency. Each pulse is 2 microseconds long and the frequencies employed are uniformly spaced at 0.5 mc. intervals. The first pulse was transmitted at frequency $f_{17}$ and the last pulse was transmitted at frequency $f_1$. The pulses are reflected by moving target 12 back to receiver 13. A filter bank 14 is provided that has a plurality of filters, each of which will pass a particular frequency. A plurality of delay lines are provided, one each for each frequency.

If a target moves at a constant known rate, the lengths of the delay lines could be modified to adjust for target motion effects, and all pulses would reach the summing device 15 at the same time. However, target speed will not ordinarily be known so a number of parallel relative delay channels must be provided, one for each target speed of interest. A plurality of pickup horns are provided, one for each target speed of interest and a detector is provided for each pickup horn.

The Doppler resolution and clutter cancellation achieved by the coherent detection system shown in FIGURE 1 of the drawing depends upon the number of pulses in the train and the elapsed time over which data is processed. For a 1-millisecond elapsed time and a 100 pulse train with jittered PRF, the Doppler resolution would be about 1 kc. and clutter is cancelled by about 20 db in the target channel.

Referring now to FIGURE 2 of the drawing, the integrator 15 is shown having a plurality of inputs equal to the number of pulses in a train. For example, for a 100 pulse train, there would be 100 inputs. The returned signal is applied to a first mixer 16 which also is fed a signal from a local oscillator. The difference between the two signals then passes to a delay line and then into a second mixer 17. The output of the second mixer, which is the transmitted frequency plus Doppler is then fed to the integrator 15.

A portion of the input signal that is fed into the integrator is extracted and fed into a phase detector 18 that also receives leakage RF from the transmitter. The difference between the two input signals, which is a phase error correction signal, is fed back to control the temperature of a heater 19 that is placed in close proximity to the delay line. Any temperature change in the delay line will change the phase delay of the delay line, thus it can be seen that the input phases will be automatically adjusted, as an increase in temperature will cause a greater delay time.

It can thus be seen that the present invention provides a method for automatically phase adjusting the inputs to a Doppler integrator by temperature controlling a plurality of delay lines with a feedback signal.

While there has been described what is at present considered to be a preferred embodiment of this invention, it will be obvious to those skilled in the art that various changes and modifications may be made therein without departing from the invention, and it is, therefore, intended to cover all changes and modifications as fall within the true spirit and scope of this invention.

What is claimed is:
1. In a radar search receiver, a device providing automatic phase adjustment comprising:
   a Doppler integrator,
   a plurality of input channels connected to said Doppler integrator, each said input channel being adaptable for feeding a radar signal of given frequency to said Doppler integrator and each said input channel having a delay line therein,
   means connected to said Doppler integrator for comparing each input signal with a reference signal, and
   feedback means connected to said means for comparing for regulating the temperature of each said delay line.

2. In a radar search receiver, a device providing automatic phase adjustment comprising:
   a Doppler integrator,
   a plurality of input channels connected to said Doppler integrator, each said input channel being adaptable for feeding a radar signal of given frequency to said Doppler integrator and each said input channel having a delay line therein, means connected to said Doppler integrator for sampling each radar signal supplied by each said input channel and comparing each said radar signal with a reference signal, and a plurality of heating elements positioned one each in close proximity to each said delay line and electrically connected to said means for comparing.

3. In a radar search receiver, a device providing automatic phase adjustment as set forth in claim 2 wherein said means sampling and comparing said radar signals with a reference signal comprises a plurality of phase detectors.

4. In a radar search receiver, a device providing automatic phase adjustment comprising:

a Doppler integrator, a plurality of input channels connected to said Doppler integrator, each said input channel being adaptable for feeding a radar signal of given frequency to said Doppler integrator, each said channel including a first mixer connected through a delay line to a second mixer, a plurality of local oscillators connected one each to each said mixer, means connected to said Doppler integrator for sampling each radar signal supplied by each said input channel and comparing each said radar signal with a reference signal, and a plurality of heating elements positioned one each in close proximity to each said delay line and electrically connected to said means for comparing.

5. In a radar search receiver, a device providing automatic phase adjustment as set forth in claim 4 wherein said means sampling and comparing said radar signals with a reference signal comprises a plurality of phase detectors.

No references cited.

RODNEY D. BENNETT, *Primary Examiner.*

C. L. WHITHAM, *Assistant Examiner.*